(12) United States Patent
Liu

(10) Patent No.: US 10,423,711 B2
(45) Date of Patent: Sep. 24, 2019

(54) GENERATING STYLE SHEETS DURING RUNTIME

(71) Applicant: Oracle International Corporation, Redwood Shores, CA (US)

(72) Inventor: Young Liu, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 542 days.

(21) Appl. No.: 15/080,395

(22) Filed: Mar. 24, 2016

(65) Prior Publication Data

US 2017/0116164 A1     Apr. 27, 2017

Related U.S. Application Data

(60) Provisional application No. 62/245,850, filed on Oct. 23, 2015.

(51) Int. Cl.
*G06F 17/22* (2006.01)
*G06F 17/21* (2006.01)
*G06F 16/957* (2019.01)

(52) U.S. Cl.
CPC ...... *G06F 17/2288* (2013.01); *G06F 16/9574* (2019.01); *G06F 17/218* (2013.01); *G06F 17/2247* (2013.01)

(58) Field of Classification Search
CPC ............... G06F 17/2288; G06F 17/218; G06F 17/2247; G06F 17/30902
See application file for complete search history.

(56) References Cited

U.S. PATENT DOCUMENTS

| 7,082,454 B1 | 7/2006 | Gheith | |
|---|---|---|---|
| 7,383,498 B1 * | 6/2008 | Hickl | G06F 17/211 715/235 |
| 7,581,177 B1 * | 8/2009 | Mollicone | G06F 17/2247 715/243 |
| 7,895,598 B2 * | 2/2011 | Eide | G06F 17/227 707/705 |
| 8,181,104 B1 * | 5/2012 | Helfand | G06F 17/2247 715/234 |
| 8,468,449 B1 * | 6/2013 | Hall | G06F 17/227 715/273 |

(Continued)

OTHER PUBLICATIONS

Ravi J et al: "A survey on dynamic Web content generation and delivery techniques", Journal of Network and Computer Applications, Academic Press, New York, NY, US, vol. 32, No. 5, Sep. 2009 (Sep. 2009), pp. 943-960, XP026266875, ISSN: 1084-8045, DOI: 10.1016/JNCA.2009.03.005 [retrieved on Apr. 5, 2009].

(Continued)

*Primary Examiner* — Howard Cortes
(74) *Attorney, Agent, or Firm* — Invoke

(57) ABSTRACT

Style sheets for resources are generated during runtime. Style sheets may be generated using current values for attributes of a resource. A new style sheet may be generated, at runtime, after a request for the resource has been received. The resource is modified to reference the new style sheet and the modified resource is transmitted to the client device. The new style sheet is transmitted to the client device in response to another request, from the client device, for the new style sheet identified in the modified resource.

22 Claims, 4 Drawing Sheets

(56) References Cited

U.S. PATENT DOCUMENTS

| | | | |
|---|---|---|---|
| 2002/0010716 A1* | 1/2002 | McCartney | G06F 16/9577 715/236 |
| 2003/0233620 A1* | 12/2003 | Vedullapalli | G06F 17/211 715/209 |
| 2003/0237046 A1* | 12/2003 | Parker | G06F 17/211 715/234 |
| 2005/0033926 A1* | 2/2005 | Dumont | G06F 16/9574 711/138 |
| 2006/0085465 A1* | 4/2006 | Nori | G06F 17/30297 |
| 2006/0197779 A1* | 9/2006 | Gossman | G06F 9/451 345/619 |
| 2007/0220480 A1* | 9/2007 | Waldman | G06F 17/2264 717/106 |
| 2009/0019378 A1* | 1/2009 | Kelkar | G06F 17/218 715/760 |
| 2009/0031211 A1 | 1/2009 | Yao et al. | |
| 2009/0300483 A1* | 12/2009 | Viet | G06F 17/2247 715/236 |
| 2011/0161803 A1* | 6/2011 | Yao | G06F 9/451 715/235 |
| 2014/0013211 A1* | 1/2014 | Sakata | G06F 17/2247 715/235 |
| 2014/0101528 A1* | 4/2014 | Pelleg | G06F 8/38 715/234 |
| 2017/0097927 A1* | 4/2017 | Levi | G06F 17/2705 |

OTHER PUBLICATIONS

Greg Barish et al: "World Wide Web Caching: Trends and Techniques", IEEE Communications Magazine, IEEE Service Center, Piscataway, US, vol. 38, No. 5, May 2000 (May 2000), pp. 178-185, XP011091295, ISSN: 0163-6804, DOI: 10.1109/35.841844.

Challenger J et al: "A scalable system for consistently caching dynamic Web data", 1 INFOCOM 99. Eighteenth Annual Joint Conference of the IEEE Computer and Communications Societies. Proceedings. IEEE New York, NY, USA Mar. 21-25, 1999, Piscataway, NJ, USA.IEEE, US, vol. 1, Mar. 21, 1999 (Mar. 21, 1999), pp. 294-303, XP010323770, ISBN: 978-0-7803-5417-3.

Jay Salvat: "How to Add Variables to Your CSS Files—Tuts+ Code Tutorial", Web Archive webpage, Oct. 8, 2015 (Oct. 8, 2015), XP055361043, Retrieved from the Internet: URL:http://web.archive.org/web/20151008054939/http://code.tutsplus.com/tutorials/how-to-add-variables-to-your-css-files-net-2663[retrieved on Apr. 3, 2017].

Henrik Stormer: "Personalized websites for mobile devices using dynamic cascading style sheets", International Journal of Web Information Systems, vol. 1, No. 2, Jan. 1, 2005 (Jan. 1, 2005), pp. 83-88, XP055141173, ISSN: 17 44-0084, DOI: 10.1108/17 440080580000085.

Anonymous: "Fingerprint (computing)—Wikipedia", Old revision of wikipedia webpage, Sep. 20, 2015 (Sep. 20, 2015), XP055361989, Retrieved from the Internet: URL:https://en.wikipedia.org/w/index.php? title= Fingerprint_(computing)&oldid=682003203 [retrieved on Apr. 5, 2017].

Makai, Full Stack Python, Cascading Style Sheets (CSS), 7 pages.

\* cited by examiner

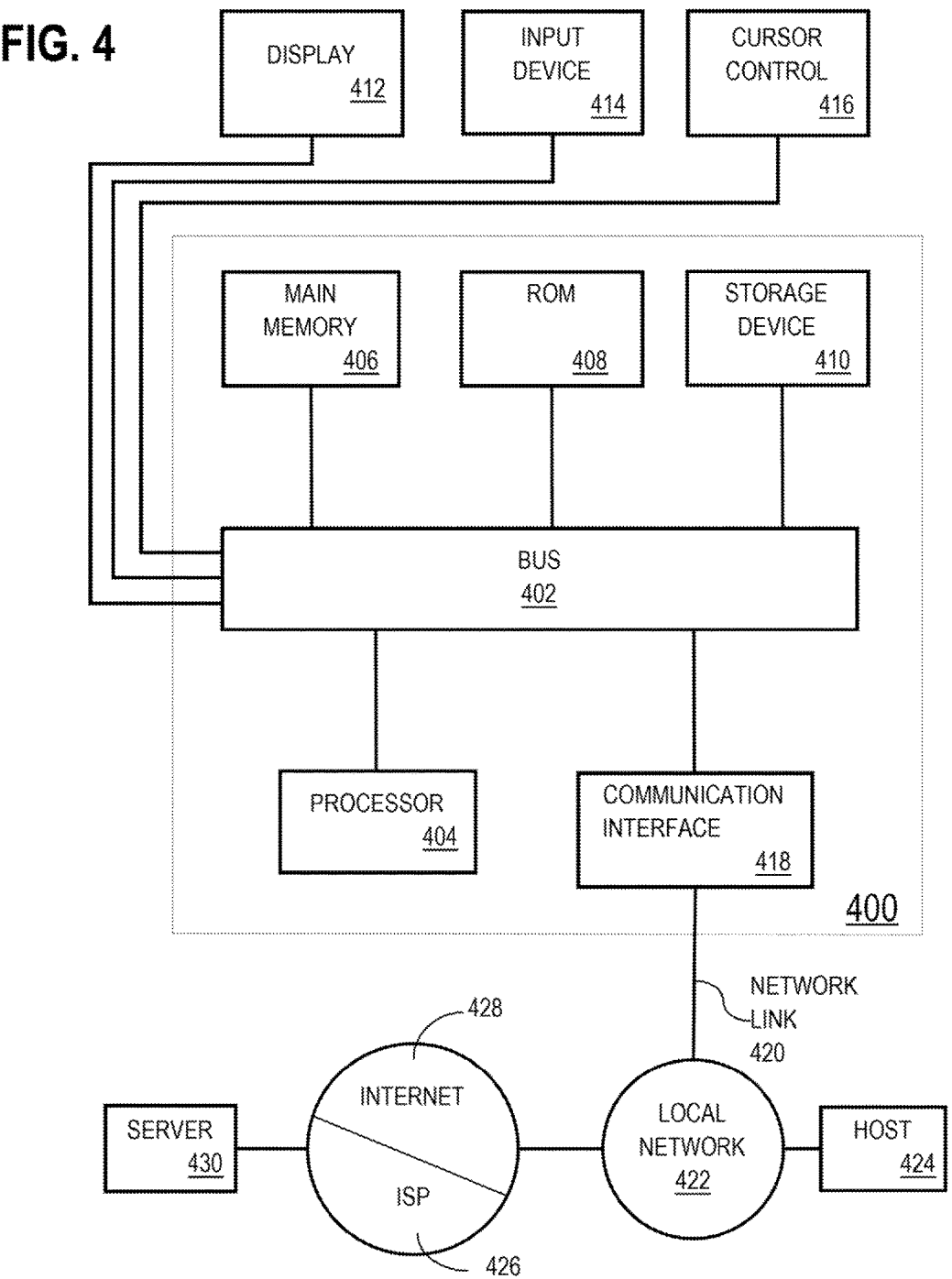

GENERATING STYLE SHEETS DURING RUNTIME

BENEFIT CLAIM; INCORPORATION BY REFERENCE

This application claims priority to the provisional application No. 62/245,850 filed on Oct. 23, 2015, the content of which is hereby incorporated by reference.

TECHNICAL FIELD

The present disclosure relates to style sheets. In particular, the present disclosure relates to generating style sheets during runtime.

BACKGROUND

A style sheet language, or style language, is a computer language that expresses the presentation of structured documents. One attractive feature of structured documents is that the content can be reused in many contexts and presented in various ways. Different style sheets can be attached to the logical structure to produce different presentations.

One example of a style sheet language with widespread use is Cascading Style Sheets (CSS), which is used to style documents written in HTML, XHTML, SVG, KUL, and other markup languages.

For content in structured documents to be presented, a set of stylistic rules—describing, for example, colors, fonts and layout—is applied. A collection of stylistic rules is called a style sheet. In electronic publishing, style sheet languages are mostly used in the context of visual presentation rather than spelling and punctuation.

The approaches described in this section are approaches that could be pursued, but not necessarily approaches that have been previously conceived or pursued. Therefore, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates a system in accordance with one or more embodiments.

DETAILED DESCRIPTION

Figure 1:
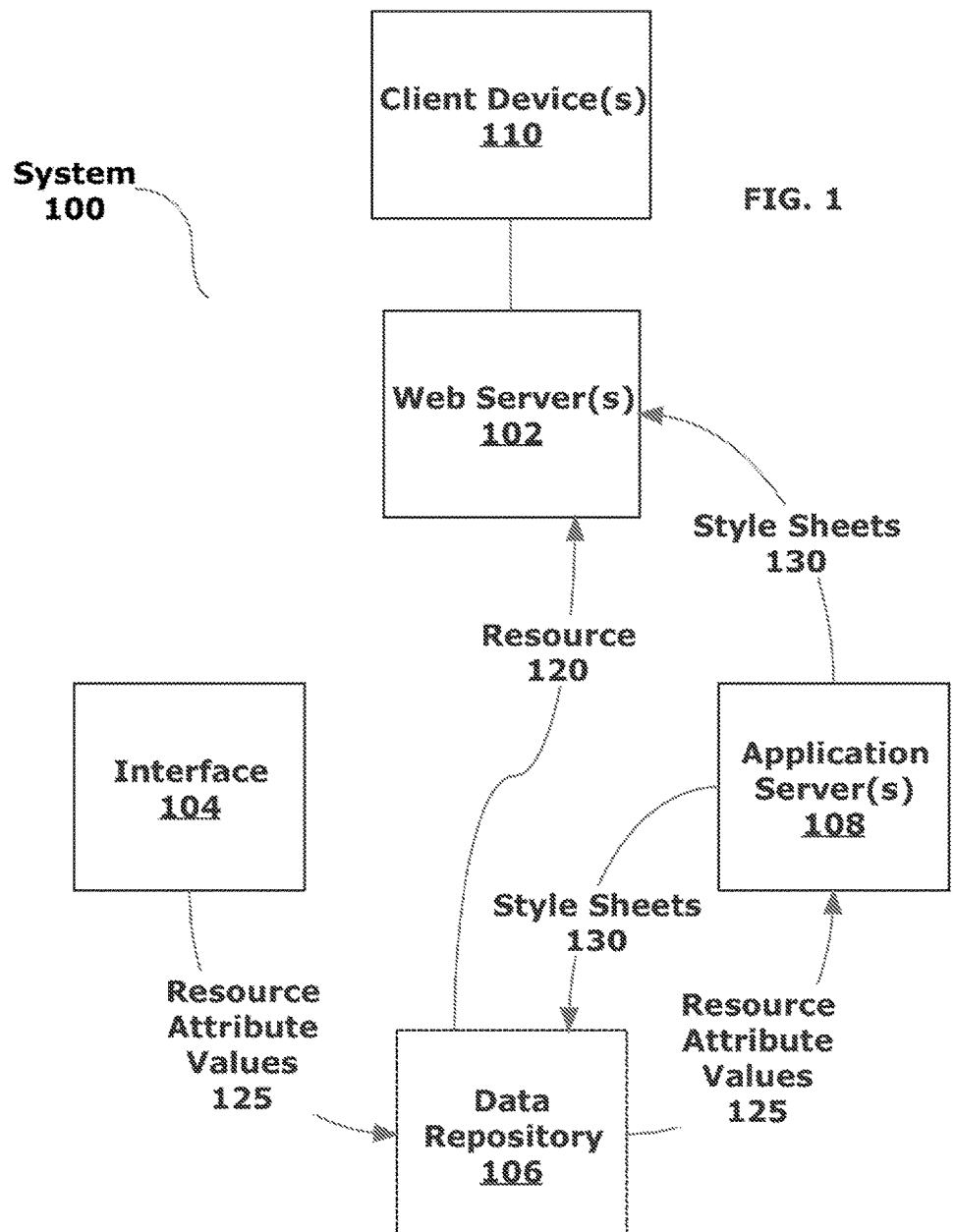
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well structures and devices are described with reference to a block diagram form in order to avoid unnecessarily obscuring the present invention. The detailed description includes the following sections:

1. GENERAL OVERVIEW
2. ARCHITECTURAL OVERVIEW
3. GENERATING STYLE SHEETS DURING RUNTIME
4. MISCELLANEOUS; EXTENSIONS
5. HARDWARE OVERVIEW

1. General Overview

One or more embodiments relate to generating style sheets during runtime. In an embodiment, a style sheet may be generated by executing code which (a) identifies stored values for various attributes of a resource and (b) generates the style sheet based on the stored values.

In an embodiment, a new style sheet is generated for a resource subsequent to receiving a request, from a client device, for the resource. In one example, a first request is received, from a client device, for a resource. A new style sheet is generated in response to determining that a value for at least one attribute of the requested resource has been modified since generation of a last-generated style sheet associated with the requested resource. The requested resource is modified to reference the new style sheet. The modified resource, with the reference to the new style sheet, is transmitted to the client device. A second request for the new style sheet is received from the client device based on the reference to the new style sheet in the modified resource. The new style sheet is transmitted to the client device.

In an embodiment, a new style sheet is generated for a resource upon identifying a modification of a value of at least one attribute of the resource. When a value of an attribute is modified, a resource(s) which is associated with the attribute is identified. Thereafter, a new style sheet is generated for the resource. The new style sheet may be generated based at least on the modified value of the at least one attribute of the resource.

In an embodiment, a new style sheet is generated for a resource in response to determining that a last-generated style sheet for the resource is outdated. When a value of an attribute is modified, a last-generated style sheet for a resource associated with the attribute is identified. The last-generated style sheet is determined to be out of date based on the modification of the value of the attribute. A new style sheet is generated for the resource. The new style sheet may be generated based at least on the modified value of the at least one attribute of the resource.

Embodiments herein allow users who are using a version of the webpage based on an old stylesheet to continue to access the old stylesheet even after the old stylesheet has been updated to a new stylesheet. Embodiments herein use a monotonically increasing number to update the stylesheet and change the page referencing the stylesheet to reference a Page name appended or prepended with the monotonically increasing number.

2. Architectural Overview

FIG. 1 illustrates a system (100) in accordance with one or more embodiments. Although a specific system is described, other embodiments are applicable to any system that can be used to perform the functionality described herein. Additional or alternate components may be included that perform functions described herein. Components described herein may be altogether omitted in one or more embodiments. One or more components described within system (100) may be combined together in a single device.

Components of the system (100) are connected by, without limitation, a network such as a Local Area Network (LAN), Wide Area Network (WAN), the Internet, Intranet, Extranet, and/or satellite links. Any number of devices connected within the system (100) may be directly connected to each other through wired and/or wireless communication segments. In one example, devices within system (100) are connected via a direct wireless connection such a Bluetooth connection, a Near Field Communication (NFC) connection, and/or a direct Wi-Fi connection.

In an embodiment, system (100) includes one or more of each of client device (110), web server (102), interface (104), data repository (106), and application server (108). Two or more of the components may be implemented on a single device or distributed across multiple devices. For example, interface 104, data repository 106, application server 108, and web server 102 may be implemented on a single device. Furthermore, operations performed by the web server (102) and application server (108) may instead be performed by a single server. Accordingly, the specific components, devices, and operations recited herein should not be construed as limiting the scope of any of the claims.

In an embodiment, the data repository (106) corresponds to any local or remote storage device. Access to the data repository (106) may be restricted and/or secured. In an example, access to the data repository (106) requires authentication using passwords, certificates, biometrics, and/or another suitable mechanism. Those skilled in the art will appreciate that elements or various portions of data stored in the data repository (106) may be distributed and stored in multiple data repositories. In one or more embodiments, the data repository (106) is flat, hierarchical, network based, relational, dimensional, object modeled, or structured otherwise. In an example, data repository (106) is maintained as a table of a SQL database and verified against other data repositories. In an embodiment, the data repository (106) stores resource attribute values (125) and/or style sheets (130).

In an embodiment, a resource (120) includes, but is not limited to, a document, data item, user interface, or any other item that may be displayed to a user. A webpage is one example of a resource (120). Attributes of a resource (referred to herein as "resource attributes") include at least style-related attributes which dictate how the resource may be presented. A resource attribute may be applicable to one or more visual elements of a resource or to the resource as a whole. Examples of resource attributes include but are not limited to color, font, thickness, layout, and accessibility. A color, for example, may apply to a background color of a webpage, or a color of a button on a webpage. Thickness may apply, for example, to a border displayed on a webpage. Resource attribute values (125) are values which correspond to various attributes of a resource. Examples of attribute:value pairs include Background-Color:Blue, Color:Black, Font-Size:10, Font-Family:TimesNewRoman, Font-Weight:Bold, Padding:0_0_0_0, and Border:12_px_solid.

In an embodiment, a style sheet (130) is a document which includes a particular set of attribute:value pairs described above. A resource (120) or metadata associated with the resource (120) may reference a particular style sheet that is to be used for presenting the resource (120). The style sheet, referenced by the resource (120), is used by an application to style the resource (120). Specifically, an application may determine how to render the resource (120) for presentation. In an example, a style sheet (130) is used by a browser to determine how to render a webpage. The style sheet (130) may indicate, to the browser, the colors and font to be used for text within the webpage.

In an embodiment, interface (104) is any type of input/output (I/O) interface, including but not limited to a screen, a monitor, a touchscreen, a keyboard, a mouse, a speaker, a microphone. The interface (104) may be implemented on client device (110), and/or any other device. Data received through interface (104) may be stored at data repository (106). In one or more embodiments, interface (104) includes one or more user interface components. User interface components include functionality for presenting any type of visual, audio, tactile, or other sensory information. In an example, user interface components refer to Graphical User Interface (GUI) elements. For example, user interface components include text fields, radio buttons, and/or check boxes through which a user may enter user input. User interface components further include functionality for accepting user input. All or a subset of user interface components may be displayed independently of each other, sequentially, or simultaneously with each other. All or a subset of user interface components may interact with each other. For example, one user interface component includes a button or other interactive field that triggers the presentation of another user interface component.

In an example, interface (104) is configured to display a list of configurable resource attributes associated with one or more resources. The interface (104) may further display the current values of the resource attributes. Furthermore, the interface (104) may accept user input to modify/update the current values of the resource attributes. The interface (104) may be implemented on client device (110) or another device.

In an embodiment, an application server (108) is a device including a hardware processor. In another embodiment, the application server (108) is a software application executing on a device including a hardware processor. The application server (108) includes any combination of hardware and/or software that includes functionality to generate style sheets (130) for one or more resources (120) based at least on resource attribute values (125). Various operations for generating style sheets, in accordance with one or more embodiments, are described below with reference to FIG. 2.

In an embodiment, a web server (102) is a device including a hardware processor. In an embodiment, the application server (108) is a software application executing on a device including a hardware processor. The application server (108) includes any combination of hardware and/or software that includes functionality to transmit resources (120) and style sheets (130) to one or more client devices (e.g., client device (110)). The web server (102) may communicate with a web browser executing on the client device (110).

In an embodiment, one or more web servers (e.g., web server (102)) receive style sheets (130) from one or more application servers (e.g., application server (108)). The web servers may include functionality to forward a style sheet (130) to a client device (110) with a corresponding resource (120). The web server may also include functionality to initially transmit a resource (120) and separately forward the style sheet (130) in response to a request for the style sheet (130). In other embodiments, functions described herein with respect to the web server (102) and application server (108) may be interchanged. Both the web server (102) and application server (108) may be implemented on the same device.

3. Generating Style Sheets During Runtime

Figure 2:
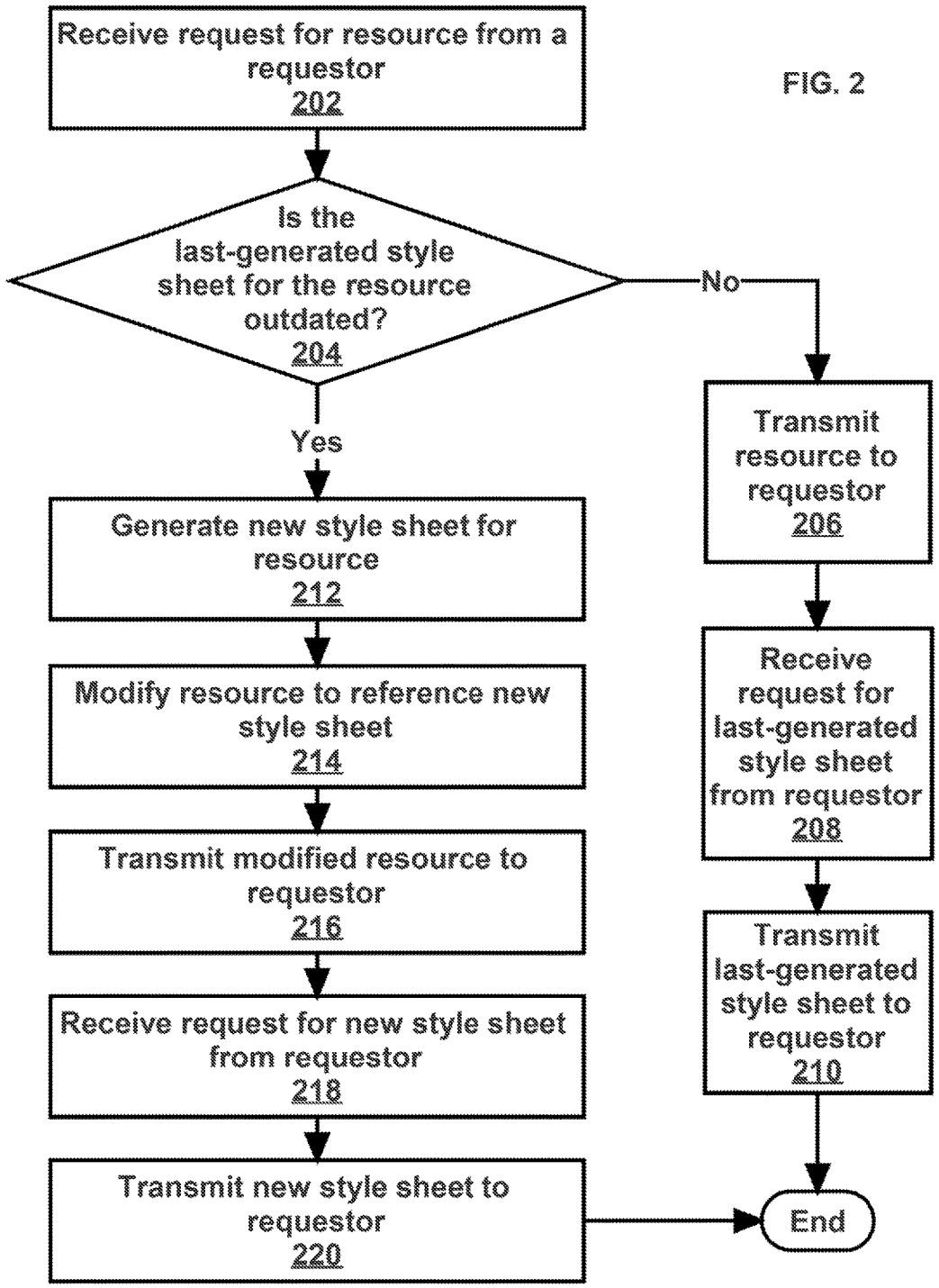
FIGS. 2 and 3 illustrate an example set of operations for generating styles sheets during runtime in accordance with one or more embodiments.

FIG. 2 illustrates an example set of operations for generating style sheets during runtime and/or subsequent to receiving requests for related content. Operations for generating style sheets, as described herein with reference to FIG. 2, may be omitted, rearranged, or modified. Furthermore, operations may be added or performed by different components or devices. Accordingly, the specific set or sequence of operations should not be construed as limiting the scope of any of the embodiments.

In an embodiment, a request for a resource is received from a requestor (Operation 202). Requests may be received over the Internet, over a local network, or over any other network(s). Requests may be received over any form of wired or wireless communication. The requestor, as referred to herein may include any device or an application/operating system executing on the device.

In one example, a browser executing on a client device initially transmits a request via HTTP for a webpage corresponding to "www.Oracle.com". The request is transmitted to a Domain Name System (DNS) server. The DNS server returns an Internet Protocol (IP) address of a web server that can serve the request by returning a webpage corresponding to "www.Oracle.com." The browser transmits the request for the webpage to the IP address identified by the DNS server. The web server corresponding to the IP address receives the request for the webpage corresponding to "www.Oracle.com."

In an embodiment, an inquiry is made as to whether the last-generated style sheet for the resource is outdated (Operation 204). A last-generated style sheet for a resource is outdated if the last-generated style sheet does not reflect the latest user selection/entry of values for resource attributes.

A variety of techniques may be used to conclude that the last-generated style sheet for a resource is outdated. Some techniques involve a comparison of (a) the values of resource attributes in the last-generated, style sheet to (b) the current values of the resource attributes. Other techniques do not require a comparison of actual values. It should be understood that any technique may be used to conclude (or estimate) whether or not the last-generated style sheet associated with a resource is outdated. Any specific technique for determining whether the last-generated style sheet is outdated should not be construed as limiting the scope of the claims.

The last-generated style sheet may be identified via analysis of the requested resource. For example, the last-generated style sheet for the resource may be referenced by the resource itself. An analysis of the resource results in identifying the reference to the last-generated style sheet, and accordingly, identification of the last-generated style sheet. In another example, the last-generated style sheet for the resource may be identified from a resource-to-style sheet mapping maintained by a web server or by an application server.

In an embodiment, the last-generated style sheet for a resource is determined to be outdated if (a) a value for at least one resource attribute indicated in the last-generated style sheet does not match (b) a current value for the at least one resource attribute in a dataset comprising the current values. The dataset, comprising, the current values, is a dataset that is maintained by the system based on a user's submissions of values corresponding to the resource attributes. As noted above, a user interface may be used by a user to submit values for a set of resource attributes. The most recent submission for any attribute is the current value for that attribute. The current values for all attributes of a resource are maintained as the dataset in a data store (e.g., a database).

In one example, determining whether the last-generated style sheet is outdated involves the use of version numbers. The values for resource attributes are associated with a version number. The version number may be maintained per value or for a set of values as a whole. Each time a value of a resource attribute is updated, the corresponding version number is updated. Each style sheet includes or is associated with a particular version number(s). The particular version number(s), associated with a style sheet, corresponds to the version number(s) of values that were the current version numbers when that style sheet was generated. If the version number(s) associated with a last-generated style sheet does not match a current version number(s), then the last-generated style sheet is determined to be outdated. If the version number(s) associated with a last-generated style sheet does match a current version number(s), then the last-generated style sheet is determined to be current (not outdated).

In another example, determining whether the last-generated style sheet is outdated involves the use of hash values. A first hash value is determined based on the values of resource attributes indicated in the last-generated style sheet. A second hash value is determined based on the current values of resource attributes. If the first hash value does not match the second hash value, then the last-generated style sheet is determined to be outdated. If the first hash value matches the second hash value, then the last-generated style sheet is determined to be current (not outdated).

In another example, determining whether the last-generated style sheet is outdated involves a comparison of (a) a first timestamp identifying a time at which the last-generated style sheet was generated with (b) a second timestamp identifying a last time at which the current values of the resource attributes were updated. If the first timestamp is earlier than the second timestamp, then the last-generated style sheet is determined to be outdated. If the first timestamp is the same as or later than the second timestamp, then the last-generated style sheet is determined to be current (not outdated).

In another example, determining whether the last-generated style sheet is outdated involves examining a flag, metadata, or content of the last-generated style sheet that indicates whether the last-generated style sheet is outdated. The last-generated style sheet for a resource may be marked as outdated anytime a value of a resource attribute associated with the style sheet is updated. If the last-generated style sheet is marked as outdated, then the last-generated style sheet is determined to be outdated. If the last-generated style sheet is not marked as outdated, then the last-generated style is determined to be current (not outdated).

If, in Operation 204, a determination is made that the last-generated style sheet for the resource is not outdated, then operations 206-210 may be performed. Specifically, the requested resource is transmitted to the requestor (Operation 206). Once the requestor receives the resource, the requestor may identify the last-generated style sheet based on a reference to the last-generated style sheet included in the resource. If the requestor has a cached version of the last-generated style sheet, then the requestor may use the cached version of the last-generated style sheet. If the requestor does not have a cached version of the style sheet referenced by the resource, the requestor may request the style sheet referenced by the resource. The request for the style sheet referenced by the resource (i.e., the last-generated style sheet) is received from the requestor (Operation 208). In response to receiving the request, the last-generated style sheet is transmitted to the requester (Operation 210). The requestor then uses the last-generated style sheet to style the resource for presentation to a user.

If, in Operation 204, a determination is made that the last-generated style sheet for the resource is outdated, then operations 212-222 may be performed. In an embodiment, a new style sheet is generated for the resource (Operation 212). In an example, generating a new style sheet may include modifying a style sheet template. A style sheet template includes style information with variable names in place of values. Modification of the style sheet template include replacing variable names with corresponding values associated with resource attributes. The replacement results in generation of a style sheet that can be used to style resources. In another example, a set of code generates each line of the style sheet by incorporating values of resource attributes and the labels for each of the resource attributes.

In an embodiment, the requested resource is modified to include a reference to the new style sheet (Operation 212). In an example, the requested resource includes a reference to a last-generated style sheet that is associated with an identifier "style_sheet_version_21". The new style sheet, generated in Operation 212, is associated with an identifier which includes an updated version number, "style_sheet_version_22." The requested resource is modified from referencing "style_sheet_version_21" to referencing "style_sheet_version_22." Modification of the resource results in obtaining a modified resource which references the new style sheet.

In an embodiment, the modified resource, which references the new style sheet, is transmitted to the requestor of the resource (Operation 216). When the requestor receives the modified resource, the requestor identifies the reference to the new style sheet. Since the new style sheet is newly created, the new style sheet has not previously been transmitted to the requestor. Accordingly, the requestor does not have a cached copy of the new style sheet. Accordingly, the requestor transmits a second request requesting the new style sheet using the identifier of the new style sheet as recited in the modified resource.

In an embodiment, a request for the new style sheet is received from the requestor (Operation 218). In response to the request for the new style sheet, the new style sheet is transmitted to the requester (Operation 220). The requestor, having received both the modified resource and the new style sheet, is able to style the resource using the new style sheet.

In an embodiment, generation of the style sheet, as described above with reference to Operation 212 subsequent to operation 204, may instead be performed after operation 218. For example, the resource may be modified to include an identifier of a to-be-generated new style sheet. Generation of the new style sheet itself may be delayed until after a request for the new style sheet (based on the identifier in the modified resource) has been received.

In an embodiment, the newly generated style sheet may be transmitted along with the resource instead of waiting for a request for the new style sheet. For example, operations 216 and 220 may be performed together. A request for the new style sheet, as illustrated in operation 218, may not necessarily be received if the new style has already been transmitted with the resource.

Figure 3:
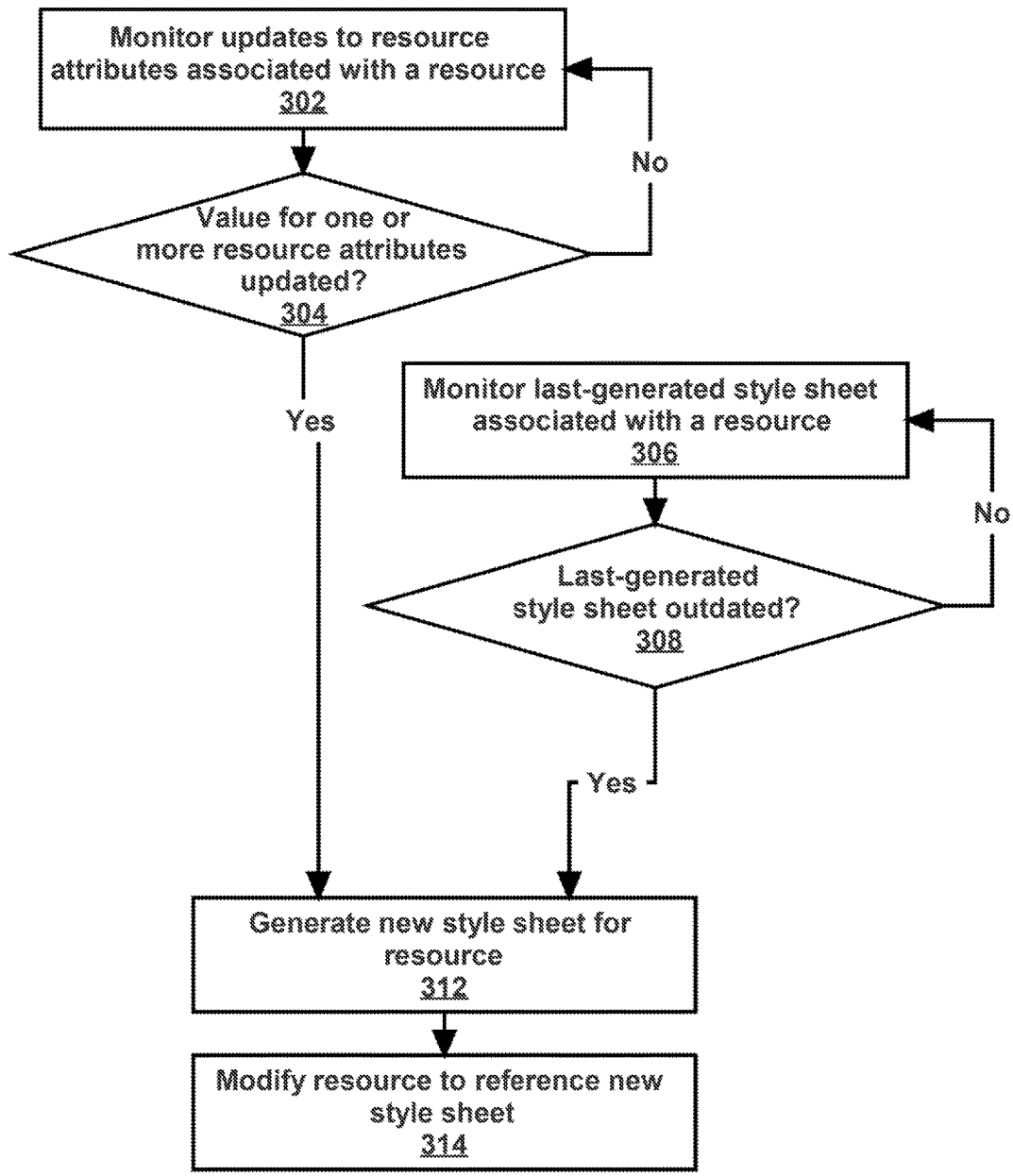

FIG. 3 illustrates an example set of operations for generating style sheets during runtime. Operations for generating style sheets, as described herein with reference to FIG. 3, may be omitted, rearranged, or modified. Furthermore, operations may be added or performed by different components or devices. Accordingly, the specific set or sequence of operations should not be construed as limiting the scope of any of the embodiments.

FIG. 3 illustrates a set of operations 302-308 which may trigger the generation of a new style sheet for a resource. The set of operations 302-308 may be performed periodically, continuously, or in response to receiving a request for a resource. In some embodiments, operations 302-308 may be performed regardless of whether a request for a resource has been received.

In an embodiment, updates to resource attributes associated with a resource are monitored (Operation 302) to determine if any values for resource attributes are updated (Operation 304). If no update to a value of resource attributes is detected, then the monitoring operation 302 is continued. If a value for at least one resource attribute is updated, then generation of a new style sheet is triggered (Operation 312) and the resource is modified to reference the new style sheet (Operation 314). Operations 312 and 314 are substantially similar to operations 212 and 214 described above.

In an embodiment, a last-generated style sheet associated with a resource is monitored (Operation 306) to determine if the last-generated style sheet is outdated (Operation 308). Operation 308 is substantially similar to Operation 204, described in detail above. If the last-generated style sheet is not outdated, then the monitoring operation 306 is continued, if the last-generated style sheet is determined to be outdated, then generation of a new style sheet is triggered (Operation 312) and the resource is modified to reference the new style sheet (Operation 314). Accordingly, either of operations 304 and 308 may trigger both the generation of a new style sheet for resource (Operation 312) and a modification of a resource to reference the new style sheet (Operation 314).

In an example, a style sheet is generated for a webpage after the request for a webpage is received from a client. The style sheet may be generated in response to receiving the request for the webpage. A first request for a particular resource is received from a client device. Subsequent to receiving the first request, a new style sheet is generated for the particular resource based on a plurality of values currently configured for a respective plurality of attributes of the particular resource. The new style sheet, for the particular resource is transmitted to the client device.

In an example, a new style sheet is generated for a particular resource in response to a new value being received for an attribute of the particular resource. A determination is made that a value for at least one attribute of a set of attributes, of the particular resource, has been modified since generation of a last-generated style sheet associated with the particular resource. Responsive to determining that the value for the at least one attribute has been modified, a new style sheet is generated. In an example, the last-generated style sheet is marked as outdated in response to determining that the value for at least one attribute of the set of attributes, of the particular resource, has been modified since generation of the last-generated style sheet.

In an example, a resource is modified to reference a new style sheet. The modified resource is transmitted in response to a request for the resource. A request for the new style sheet is received based on the reference to the new style sheet included in the modified resource. The new style sheet may be generated after the request for the new sheet is received. Accordingly, when the resource is modified to reference the new style sheet, the new style sheet may not necessarily have been created.

In an example, a new style sheet is generated for a resource in response to receiving update value for the resource. User input including an updated value for a particular resource attribute is received. A resource associated with the resource attribute is identified. An updated style sheet is generated for the resource based at least on the updated value.

In an example, a new style sheet is generated for a resource in response to determining, that a last-generated style sheet is outdated. A value for at least one attribute of a plurality of attributes, for a particular resource, is determined to have been modified since generation of a last-generated style sheet corresponding to the particular resource. Responsive to the determining operation, an updated style sheet is generated for the resource based at least on the value for the at least one attribute.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing, devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any r n-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the Rum acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infrared transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A non-transitory computer readable medium comprising instructions which, when executed by one or more hardware processors, causes performance of operations comprising:
   receiving, from a client device, a first request for a particular resource;
   responsive to receiving the first request and determining a new style sheet is needed, generating the new style sheet for the particular resource based on a plurality of values currently configured for a respective plurality of attributes of the particular resource, the generating the new style sheet comprising modifying a style sheet template by replacing a variable name with a corresponding value associated with a respective attribute of the particular resource;
   wherein the variable name in the style sheet template is not valid for evaluation as part of a valid style sheet prior to the modifying operation; and
   transmitting, to the client device, the new style sheet for the particular resource.

2. The medium of claim 1, wherein the operations further comprise:
   prior to generating the new style sheet: determining that a value for at least one attribute of the plurality of attributes, of the particular resource, has been modified since generation of a last-generated style sheet associated with the particular resource; and
   wherein the new style sheet is generated in response to determining that the value for the at least one attribute has been modified since generation of the last-generated style sheet.

3. The medium of claim 2, wherein determining that the value for the at least one attribute has been modified comprises comparing (a) a first version number, corresponding to the value for the at least one attribute, stored in association with the value and (b) a second version number, corresponding to the value for the at least one attribute, stored in association with the last-generated style sheet.

4. The medium of claim 2, wherein determining that the value for the at least one attribute has been modified comprises comparing (a) a first time-stamp associated with receiving or storing the value for the at least one attribute with (b) a second time-stamp associated with generation of the last-generated style sheet.

5. The medium of claim 2, wherein determining that the value for the at least one attribute has been modified comprises comparing (a) a first hash value based on at least a portion of the plurality of values currently configured for the respective plurality of attributes of the particular resource with (b) a second hash value based on at least a portion of values within the last-generated style sheet.

6. The medium of claim 1, wherein the operations further comprise:
   prior to generating the new style sheet: determining that a value for at least one attribute of the plurality of attributes, of the particular resource, has been modified since generation of a last-generated style sheet; and
   responsive to determining that the value for the at least one attribute has been modified since generation of the last-generated style sheet: marking or modifying the last-generated style sheet such that the last-generated style sheet is identified as an outdated style sheet.

7. The medium of claim 1, wherein the operations further comprise:
  modifying the particular resource to include a reference to the new style sheet to obtain a modified resource; and
  transmitting the modified resource in response to the first request.

8. The medium of claim 7, wherein the reference to the new style sheet comprises a version number associated with the new style sheet.

9. The medium of claim 7, wherein the particular resource is modified in response to determining that a value for at least one attribute of the plurality of attributes, of the particular resource, has been modified since generation of a last-generated style sheet.

10. The medium of claim 1, wherein the new style sheet is generated in response to receiving the first request.

11. The medium of claim 10, wherein the operations further comprise:
  responsive to receiving the first request for the particular resource:
  determining that an identifier for the new style sheet is included in the particular resource;
  determining that no style sheet corresponds to the identifier; and
  generating the style sheet with the identifier included in the particular resource.

12. The medium of claim 1, wherein the operations further comprise:
  transmitting, to the client device, the particular resource in response to the first request;
  receiving, from the client device, a second request comprising an identifier corresponding to the style sheet; and
  wherein the style sheet is transmitted to the client device in response to receiving the second request.

13. The medium of claim 12, wherein the style sheet is generated in response to receiving the second request.

14. The medium of claim 1, wherein the operations further comprise transmitting, to the client device, an outdated style sheet in response to a third request for a particular resource associated with the outdated style sheet.

15. The medium of claim 1, wherein the operations further comprise transmitting, to a second client device, an outdated style sheet for the particular resource corresponding to the new style sheet transmitted to the client device based on a second version of the particular resource used by the second client device being outdated.

16. A non-transitory computer readable medium comprising instructions which, when executed by one or more hardware processors, causes performance of operations comprising:
  receiving user input comprising an updated value for a particular resource attribute in a plurality of resource attributes;
  determining that a resource is associated with the particular resource attribute for which the updated value was received; and
  responsive to determining that the resource is associated with the particular resource attribute for which the updated value was received:
  generating an updated style sheet for the resource based at least on the updated value, the generating the updated style sheet comprising modifying a style sheet template by replacing a variable name with a corresponding value associated with the particular resource attribute;
  wherein the variable name in the style sheet template is not valid for evaluation as part of a valid style sheet prior to the modifying operation.

17. The medium of claim 16, wherein the operations further comprise modifying the resource to reference the updated style sheet.

18. The medium of claim 16, wherein the operations further comprise:
  determining that a plurality of resources are associated with the particular resource attribute for which the updated value was received;
  responsive to determining that the plurality of resources are associated with the particular resource attribute for which the updated value was received:
  generating a respective plurality of updated style sheets for the plurality of resources.

19. The medium of claim 16, wherein determining that the resource is associated with the particular resource attribute for which the updated value was received comprises identifying the resource based on a resource-to-resource attribute mapping.

20. A non-transitory computer readable medium comprising instructions which, when executed by one or more hardware processors, causes performance of operations comprising:
  determining that a value for at least one attribute of a plurality of attributes, for a particular resource, has been modified since generation of a last-generated style sheet corresponding to the particular resource; and
  responsive to the determining operation:
  generating an updated style sheet for the resource based at least on the value for the at least one attribute, the generating the updated style sheet comprising modifying a style sheet template by replacing a variable name with a corresponding value associated with the at least one attribute of the particular resource;
  wherein the variable name in the style sheet template is not valid for evaluation as part of a valid style sheet prior to the modifying operation.

21. The medium of claim 20, wherein the operations further comprise modifying the particular resource to reference the updated style sheet.

22. The medium of claim 20, wherein determining that the value for the at least one attribute has been modified comprises receiving a notification indicating that the value for the at least one attribute has been modified.

* * * * *

UNITED STATES PATENT AND TRADEMARK OFFICE
CERTIFICATE OF CORRECTION

PATENT NO. : 10,423,711 B2
APPLICATION NO. : 15/080395
DATED : September 24, 2019
INVENTOR(S) : Liu Page 1 of 1

It is certified that error appears in the above-identified patent and that said Letters Patent is hereby corrected as shown below:

In the Specification

In Column 1, Line 27, delete "KUL," and insert -- XUL, --, therefor.

In Column 2, Line 56, delete "Page" and insert -- page --, therefor.

In Column 5, Line 59, delete "comprising," and insert -- comprising --, therefor.

In Column 8, Lines 27-28, delete "continued, if" and insert -- continued. If --, therefor.

In Column 9, Line 9, delete "determining," and insert -- determining --, therefor.

In Column 9, Line 59, delete "computing," and insert -- computing --, therefor.

In Column 11, Line 2, delete "Rum" and insert -- form of --, therefor.

In Column 11, Line 14, delete "infrared" and insert -- infra-red --, therefor.

Signed and Sealed this
Eighth Day of September, 2020

Andrei Iancu
*Director of the United States Patent and Trademark Office*